United States Patent [19]

Wong

[11] Patent Number: 4,787,096
[45] Date of Patent: Nov. 22, 1988

[54] SECOND-ORDER CARRIER/SYMBOL SYCHRONIZER

[75] Inventor: Hee Wong, San Jose, Calif.

[73] Assignee: National Semiconductor Corp., Santa Clara, Calif.

[21] Appl. No.: 21,413

[22] Filed: Mar. 4, 1987

[51] Int. Cl.[4] .............................................. H04L 7/02
[52] U.S. Cl. ..................................... 375/120; 329/50; 375/95; 375/110
[58] Field of Search ................... 375/80, 81, 95, 110, 375/120; 331/1 A, 25, 34, 76; 329/50, 110

[56] References Cited

U.S. PATENT DOCUMENTS

| | | | |
|---|---|---|---|
| 4,066,978 | 1/1978 | Cox, Jr. et al. | 331/1 A |
| 4,079,329 | 3/1978 | England et al. | 329/50 |
| 4,642,574 | 2/1987 | Hofmann | 375/81 |
| 4,686,484 | 8/1987 | Otani | 329/110 |

Primary Examiner—Benedict V. Safourek
Attorney, Agent, or Firm—Limbach, Limbach & Sutton

[57] ABSTRACT

A synchronizer circuit for recovering a clock signal from synchronizing strobes derived from a modulated dibit phase shift keying (PSK) input signal. A phase detector samples the output of a number controlled oscillator at synchronizing strobe intervals corresponding to zero crossings of the PSK input signal. The phase detector generates binary weighted outputs which are measured of the phase error between the number controlled oscillator and the synchronizing strobes.

10 Claims, 15 Drawing Sheets

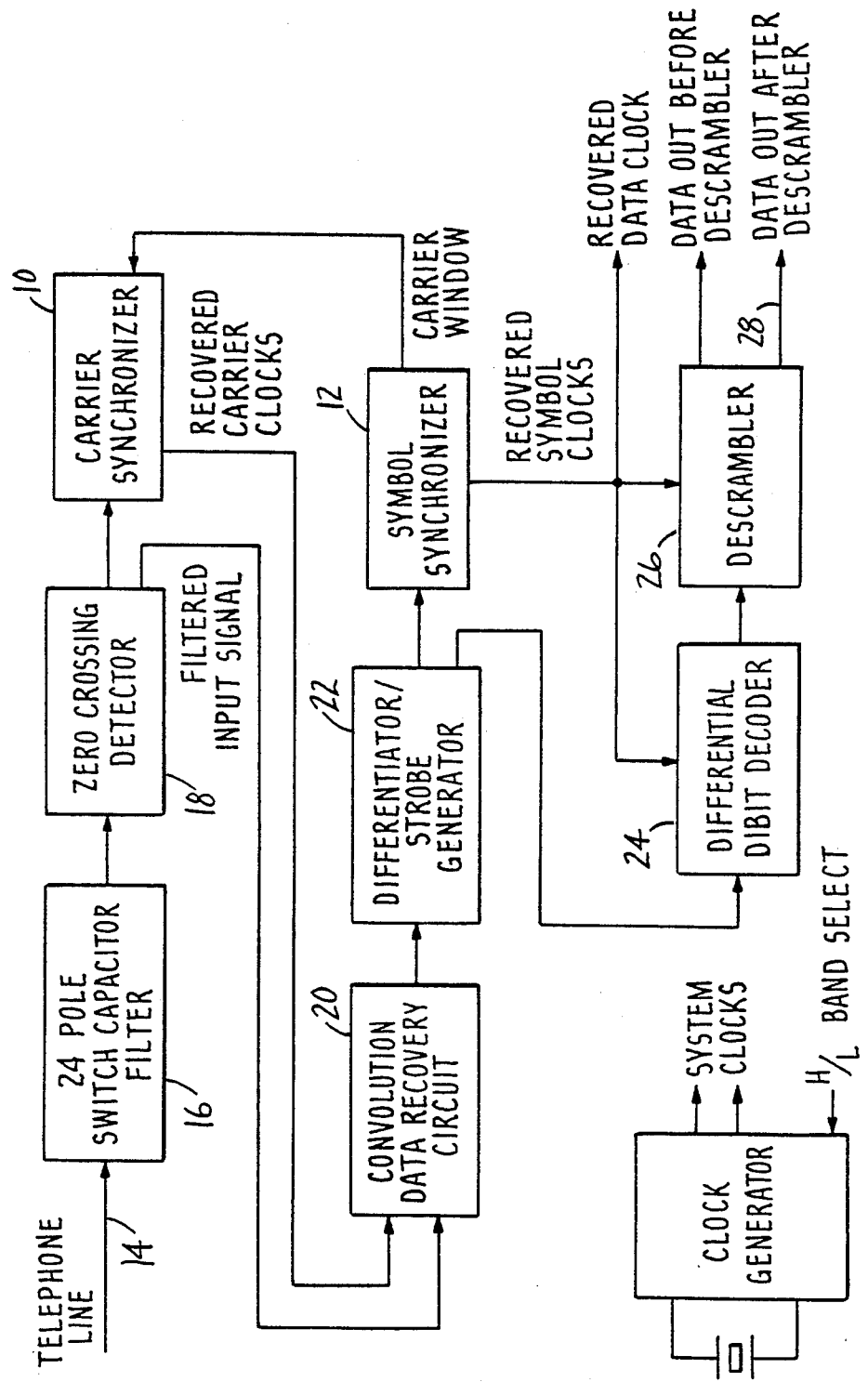

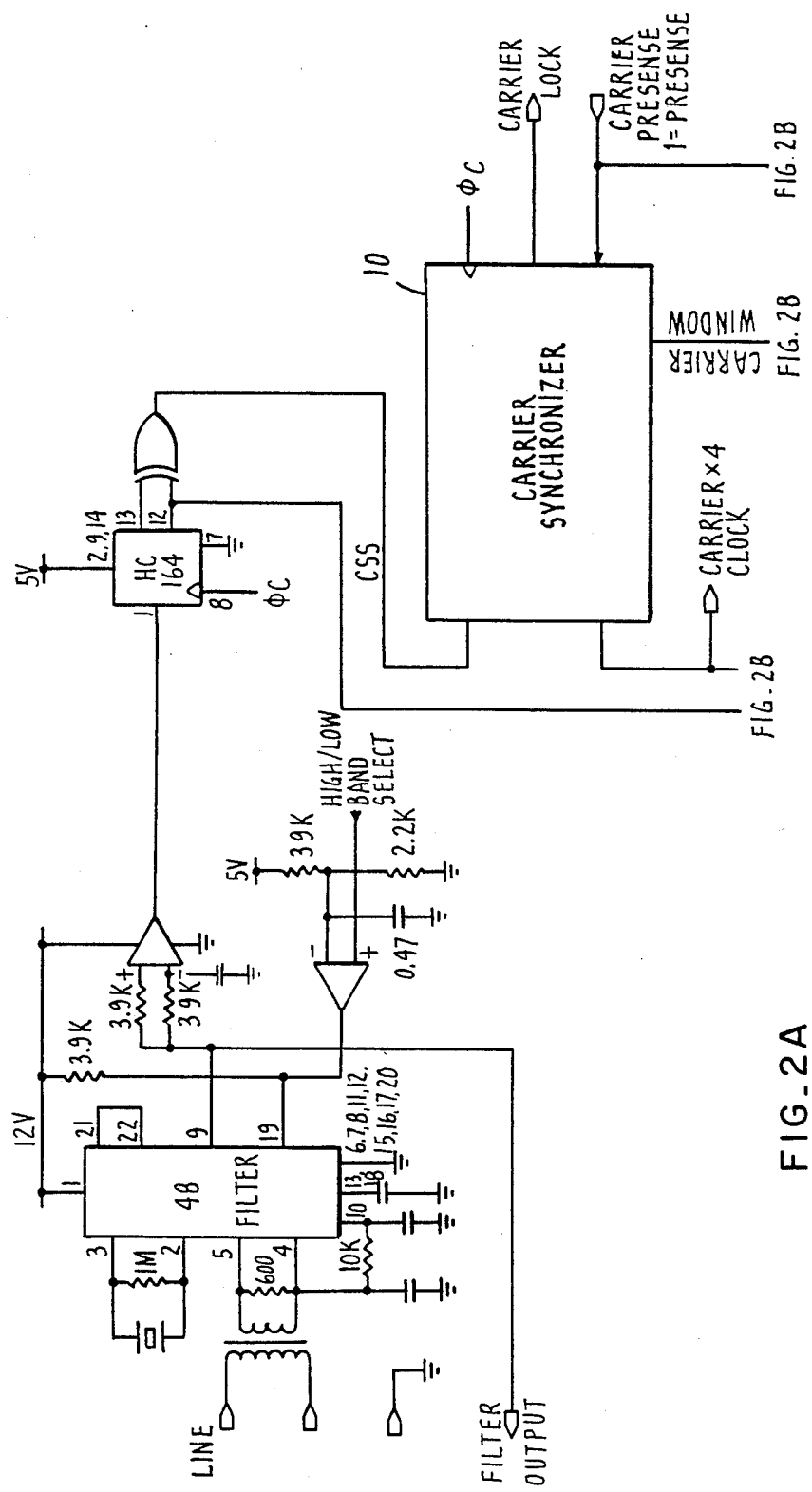
FIG._2A

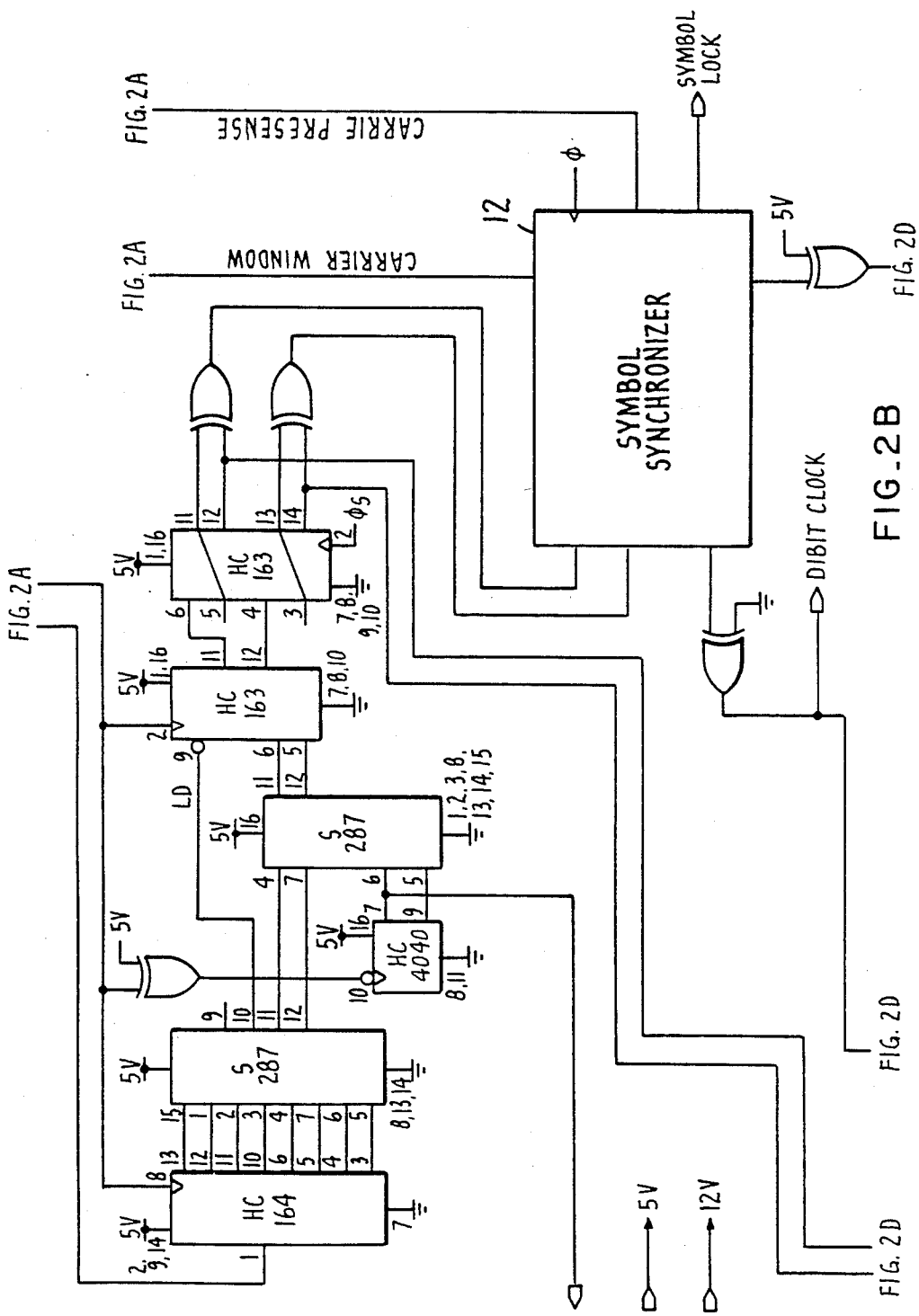

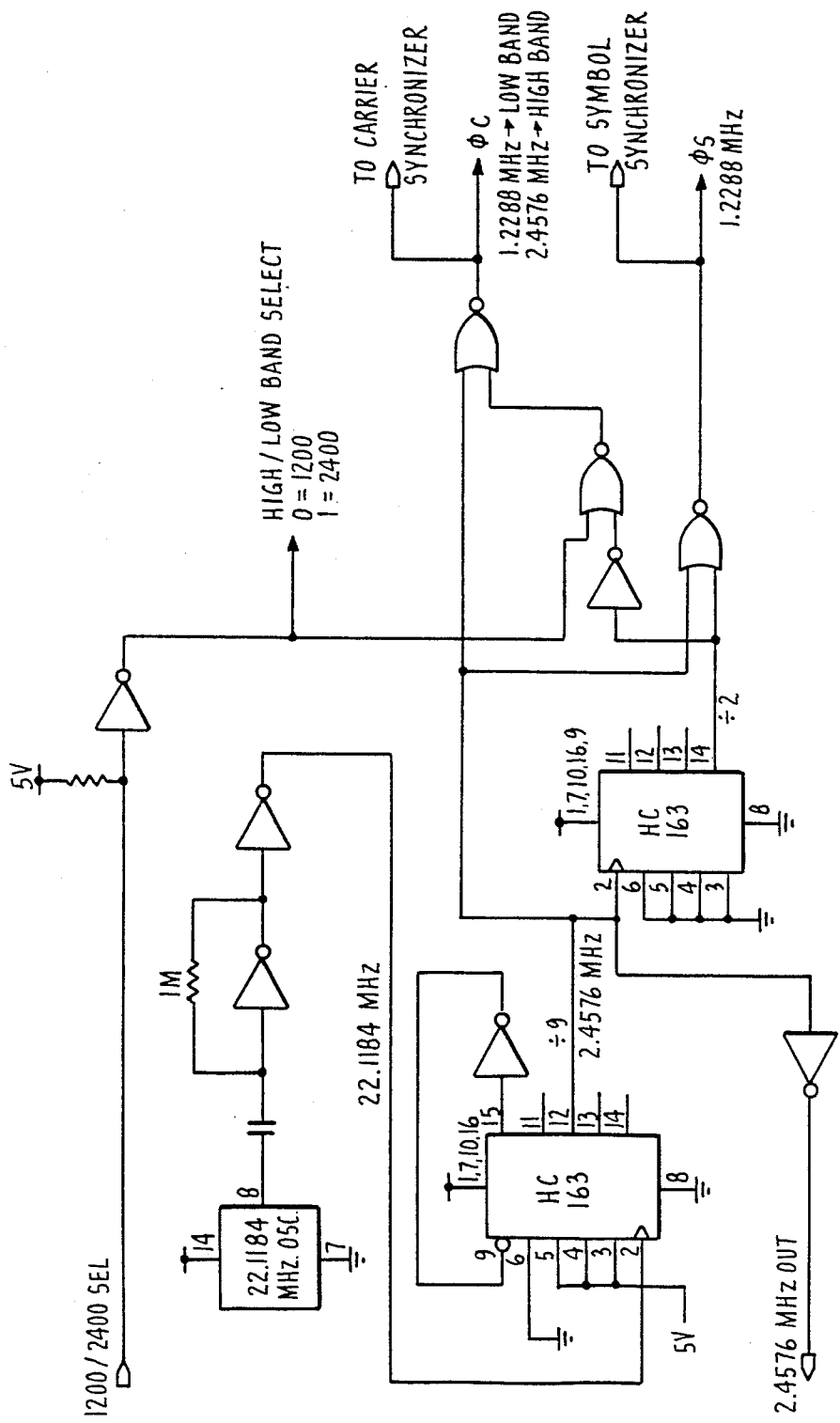
FIG_2C

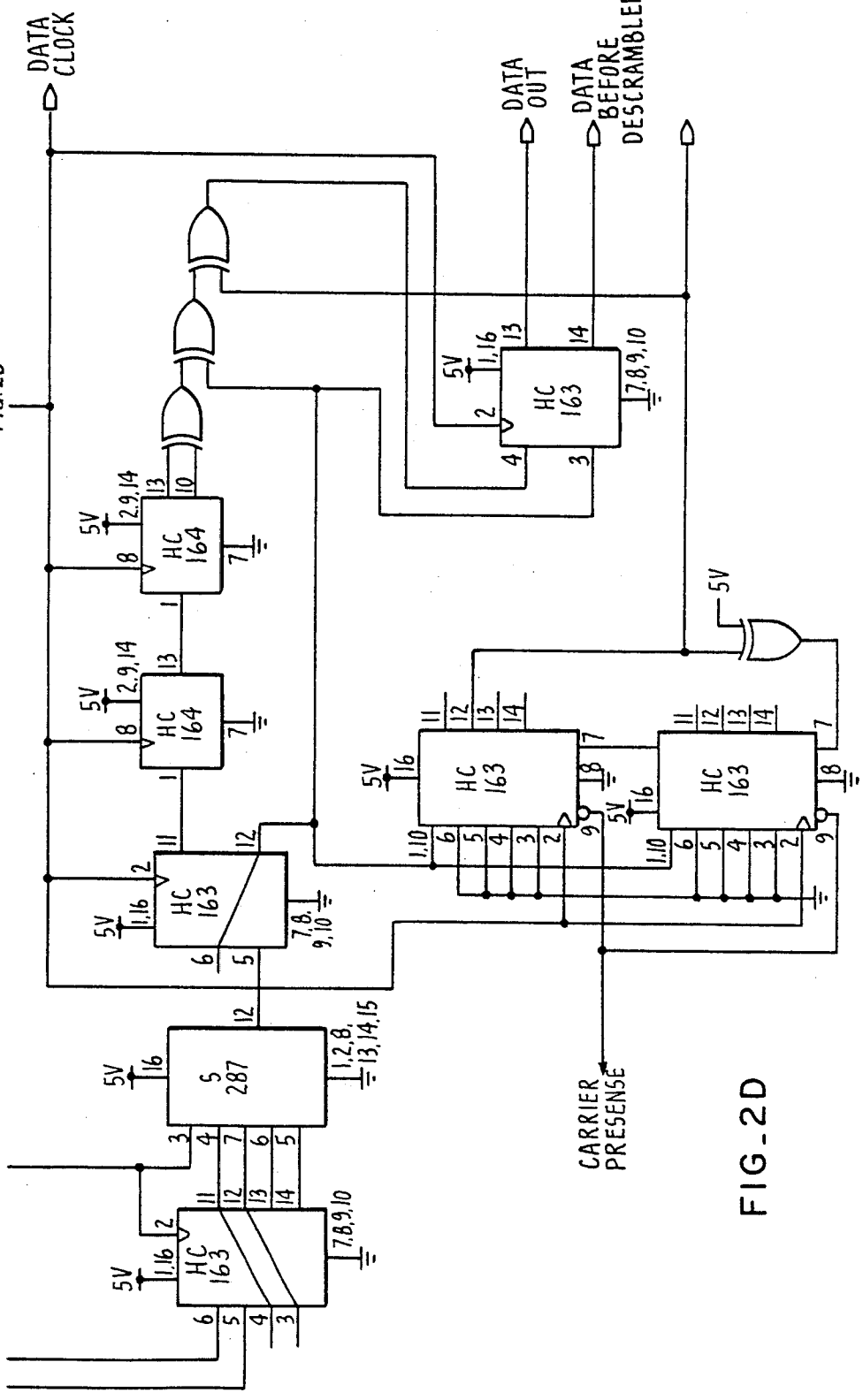

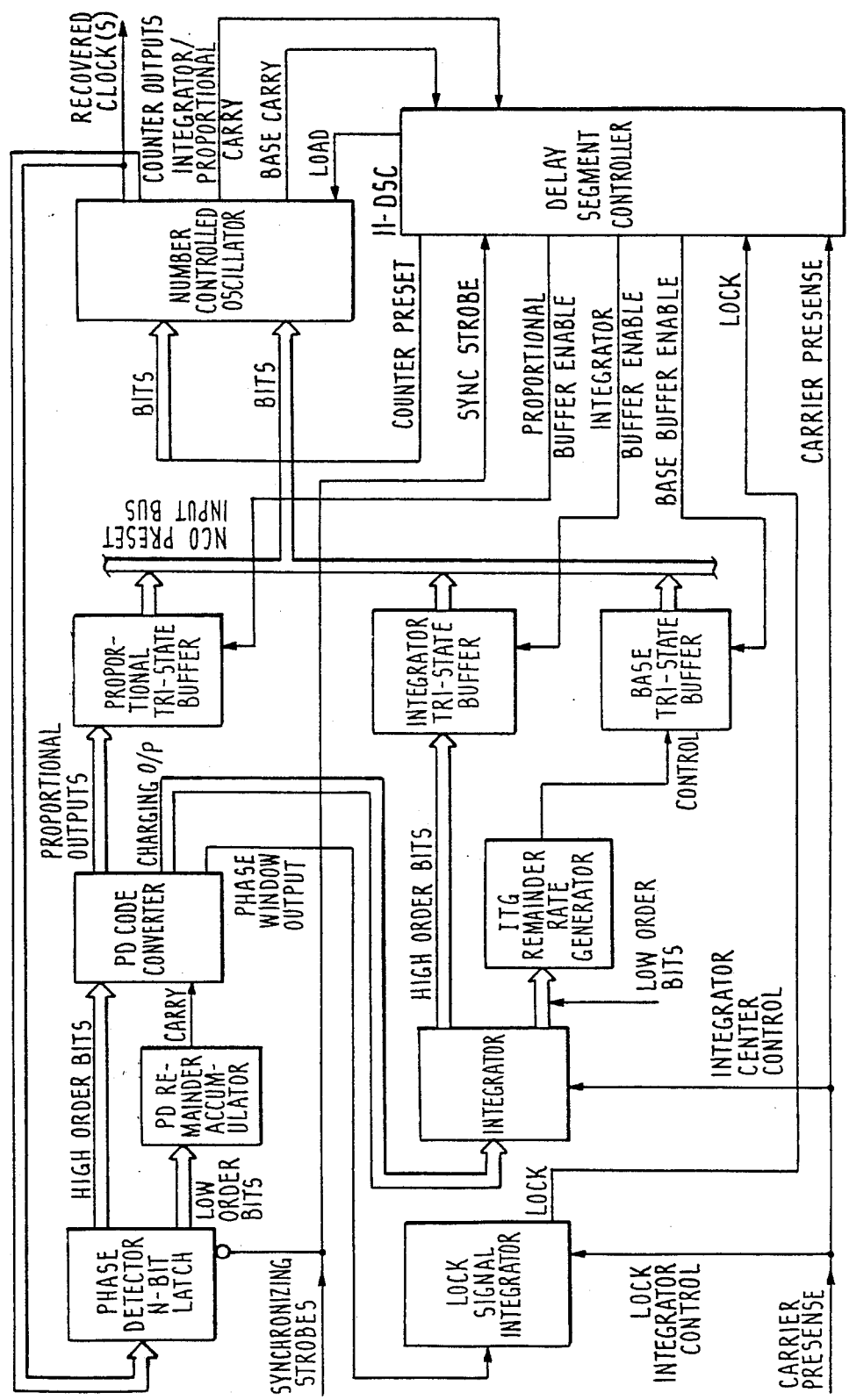
FIG_3

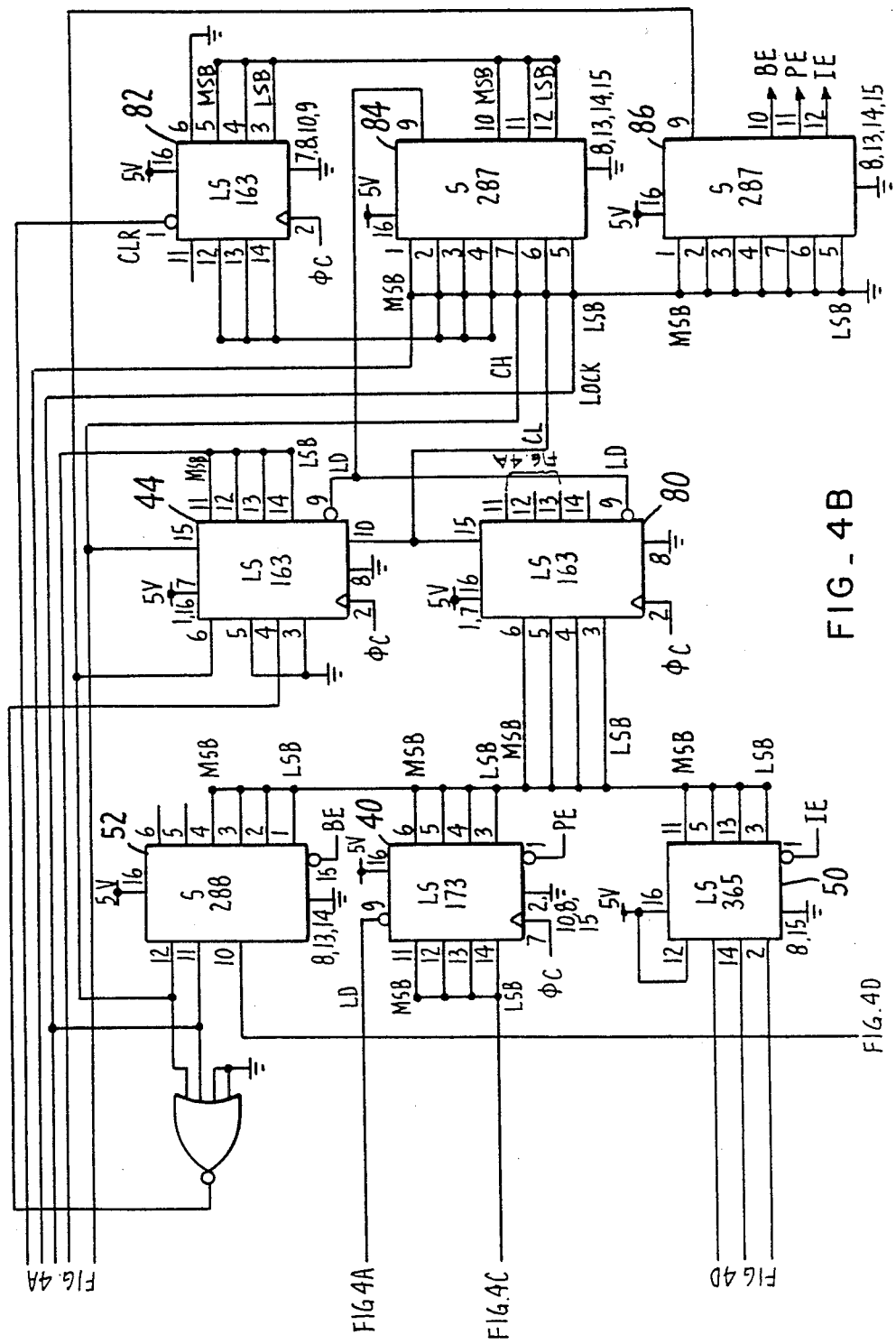
FIG_4B

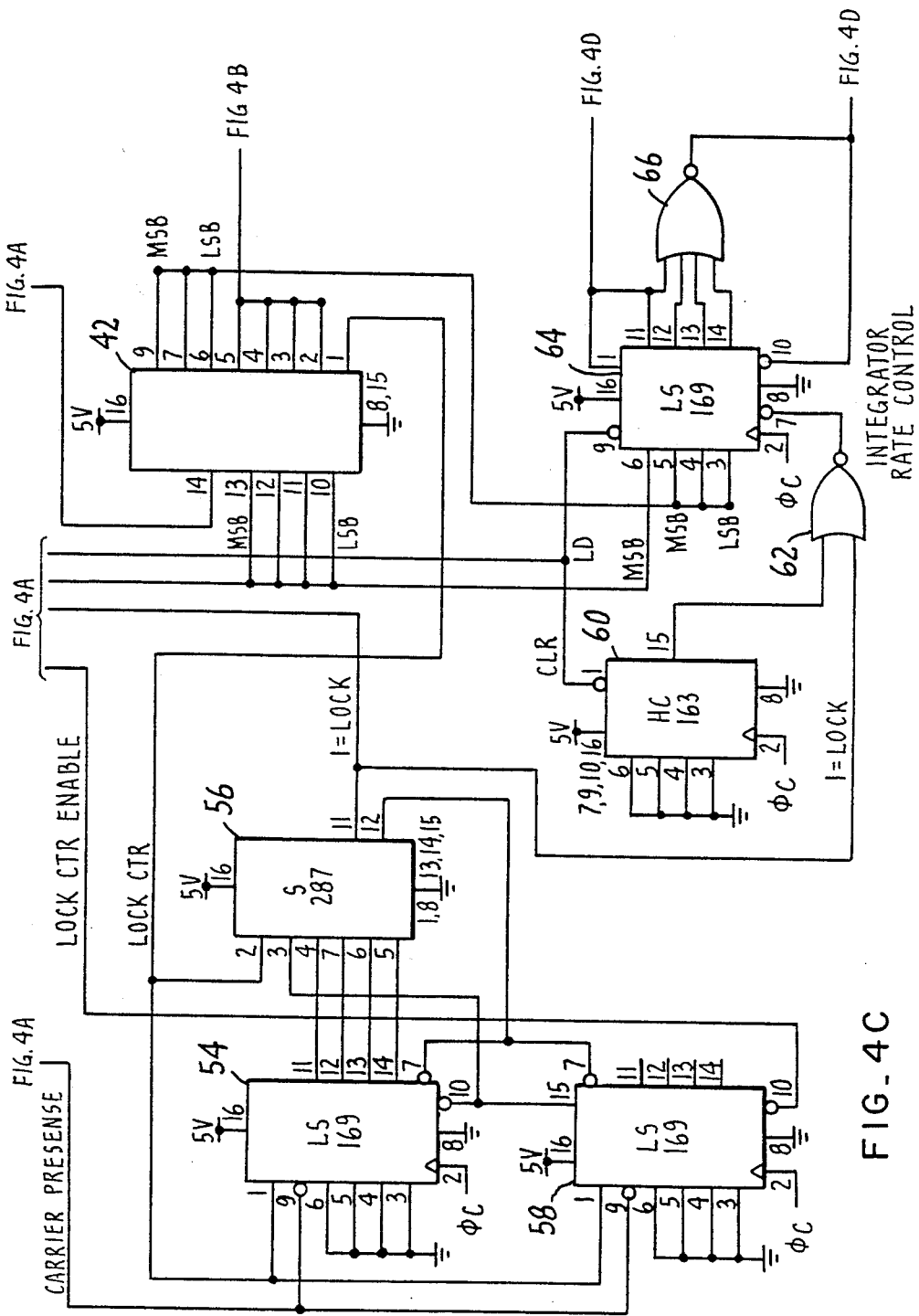

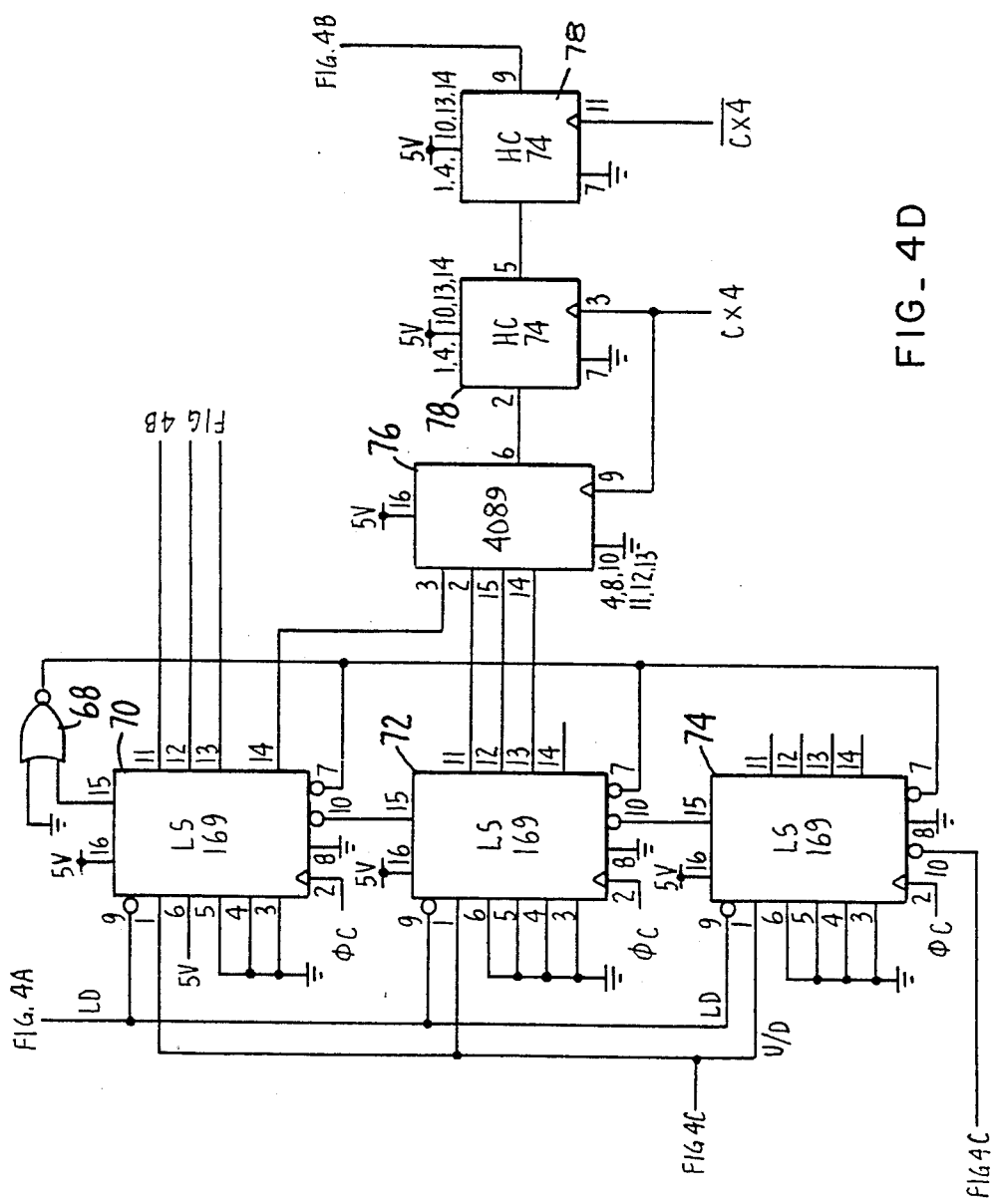
FIG_4D

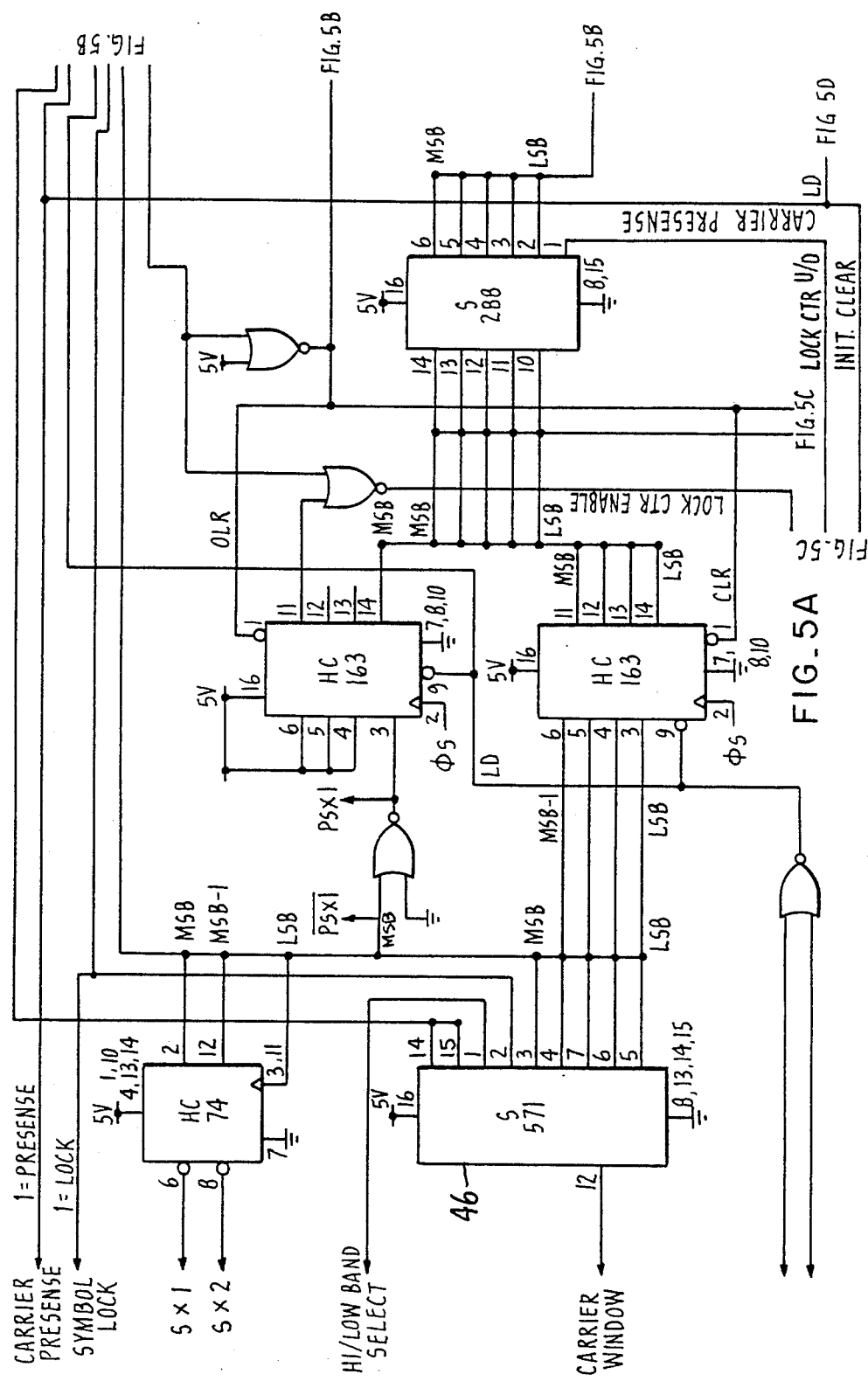

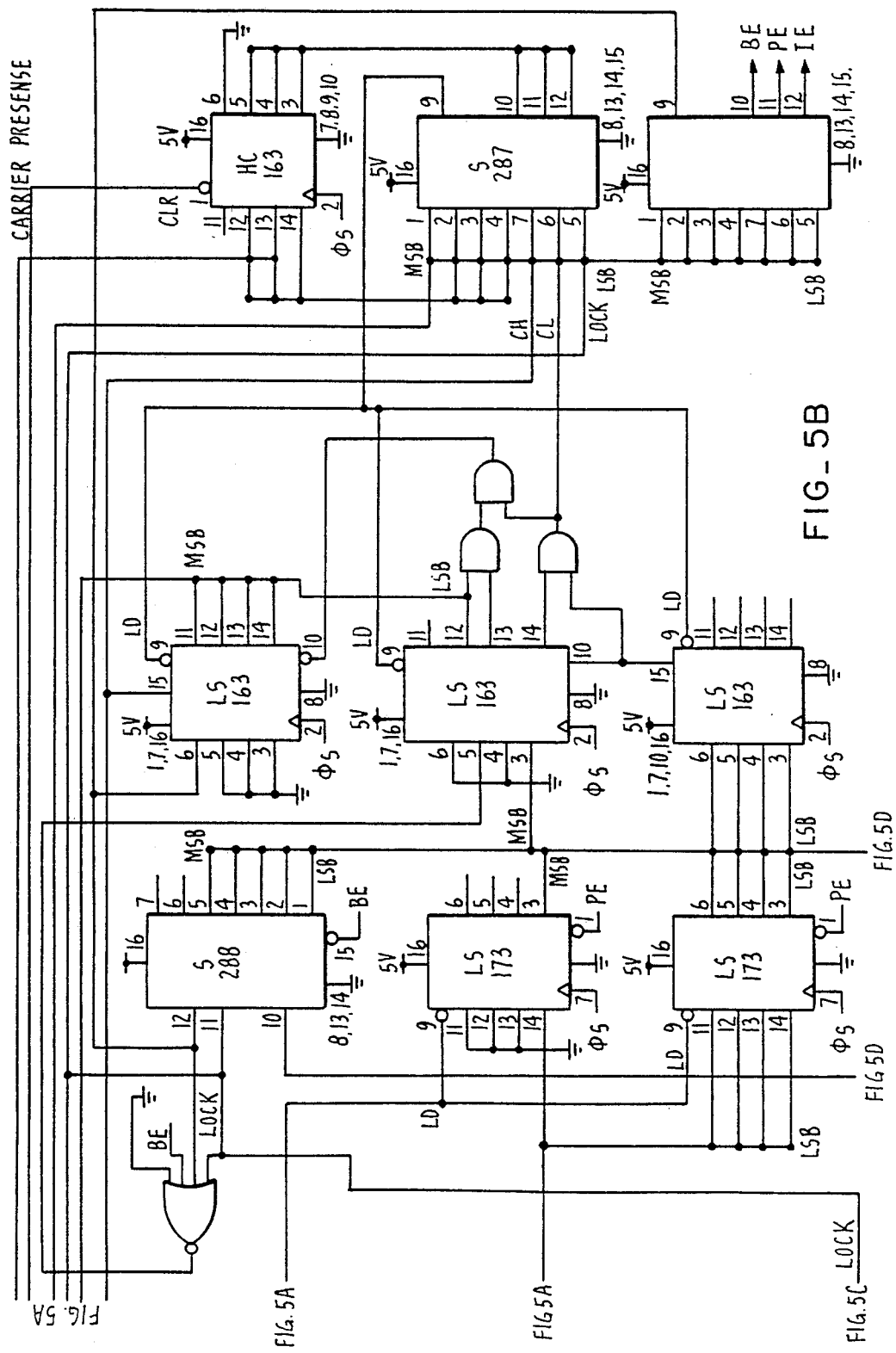
FIG_5B

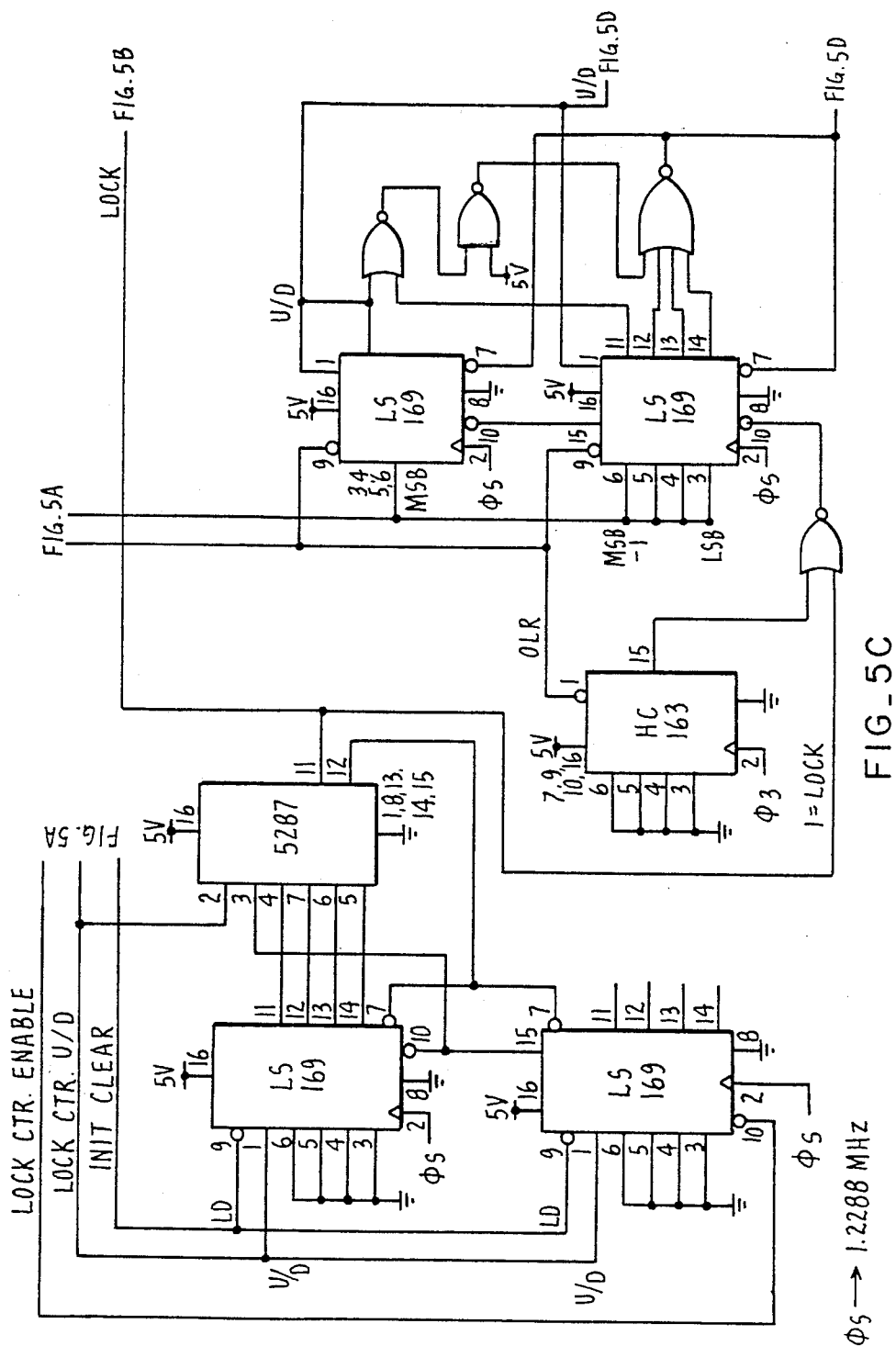

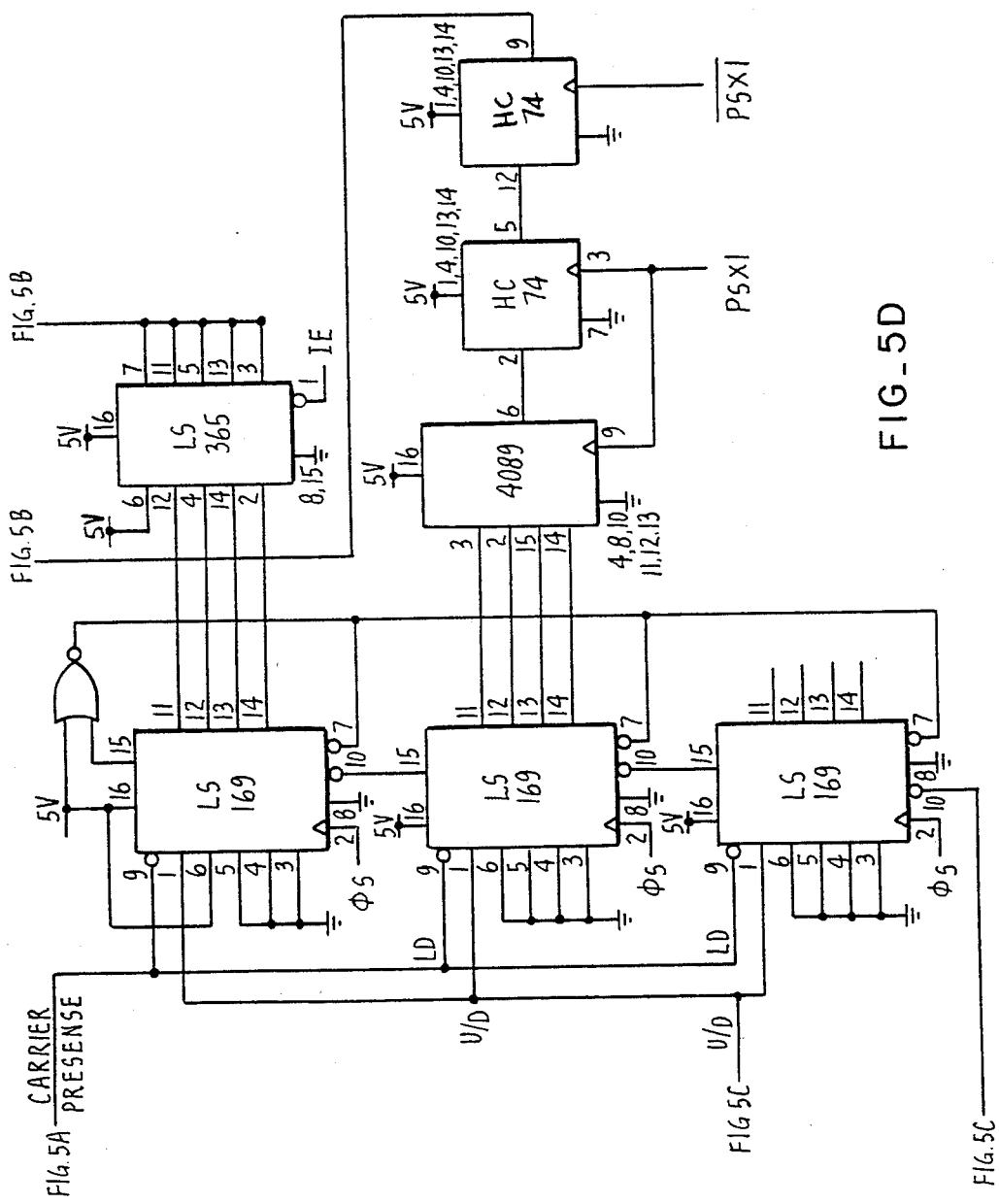

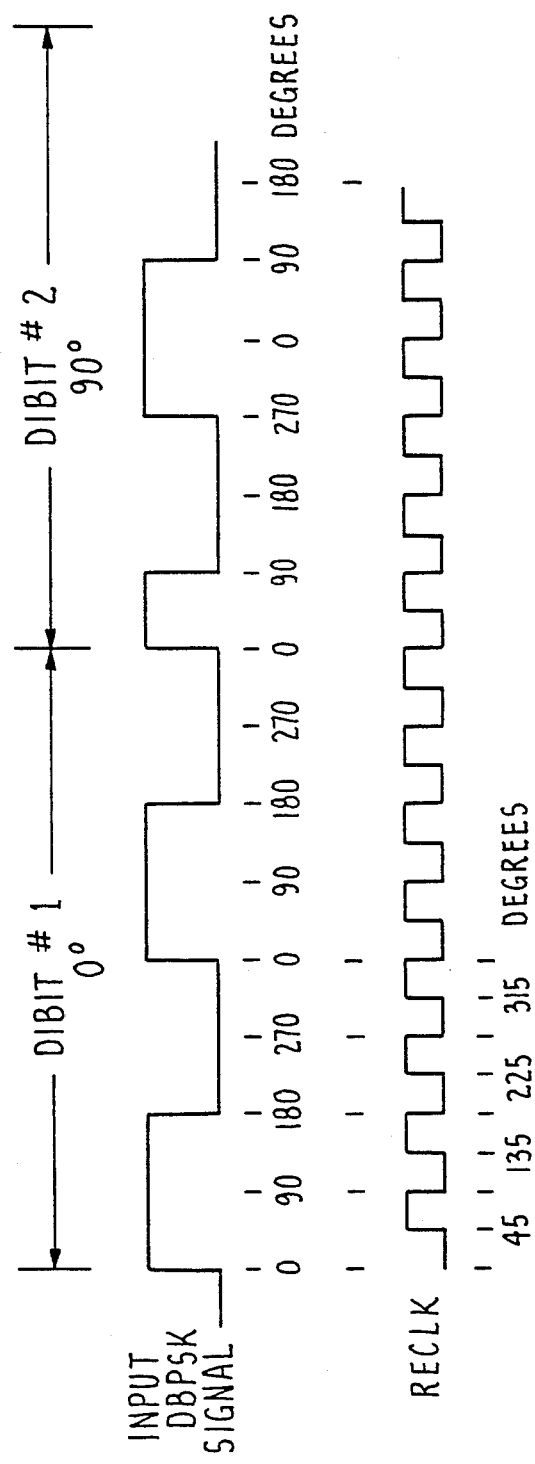

SECOND-ORDER CARRIER/SYMBOL SYCHRONIZER

BACKGROUND OF THE INVENTION

1. Field of the Invention

The present invention relates to telecommunications systems and, in particular, to a second-order phase locked loop (PLL) synchronizer circuit that adapts to carrier regeneration and baseband data timing recovery circuits in modem applications.

2. Discussion of the Prior Art

A basic digital communication system transmits information over a communications channel between a source and a destination which are physically separated from one another.

Communications channels designed to handle voice transmissions (i.e., the telephone network) have inherent characteristics which make it difficult for them to be used to transmit binary bit streams. Therefore, to permit the transmission of digital data over voice channels, it is necessary to convert the digital data at the transmission point into a signal which is compatible with the voice channel. This is done by utilizing the digital data to modulate a carrier waveform which is within the voice frequency range, transmitting the modulated signal, and then demodulating the signal at the receiver to separate the transmitted data from the modulated carrier waveform.

Data communications systems that operate at high data transmission rates, i.e. 1200 baud or more, typically use a modulation technique know as phase shift keying (PSK) modulation.

A 2-phase PSK system uses one phase of the carrier frequency for one binary state and the other phase for the other binary state. The two phases are 180° apart and are detected by a synchronous detector using a reference signal at the receiver which is of known phase with respect to the incoming signal. This known signal is at the same frequency as the incoming signal carrier and is arranged to be in phase with one of the binary signals.

In a relative phase PSK system, a binary "1" is represented by sending a signal burst of the same phase as that of the previous signal burst. A binary "0" is represented by a signal burst of a phase opposite that of the previously transmitted signal. The signals are demodulated at the receiver by integrating and storing each signal burst for one bit period for phase comparison with the next signal burst.

In a quadrature or 4-phase PSK system, two binary channels are phase multiplexed onto one tone by placing them in phase quadrature. In 4-phase PSK, one of four possible waveforms is transmitted during each signalling interval. These waveforms correspond to phase shifts of 0°, 90°, 180° and 270°. The receiver utilizes two local reference waveforms derived from a coherent local carrier to demodulate the signals.

Quadrature phase shift keying schemes provide the best tradeoff between power and band width requirements.

However, to accurately demodulate an incoming PSK signal, the output of the receiving filter must be sampled at precise sampling instants. To do this sampling requires a receiver clock signal that is synchronized with the transmitter clock signal. Lack of synchronization will result in signal distortion.

There are three general ways of obtaining this synchronization. According to a first method, the clock information can be derived from a primary or secondary standard; for example, the transmitter and receiver can be controlled from the same master clock. A second method utilizes a transmitted synchronizing clock signal. According to a third method, the clock signal is derived from the received waveform itself.

The first method mentioned above is used most often in large data communications networks. However, the high cost of this method does not justify its use in point-to-point systems with low transmission rates. The second method involves the transmission of a clock signal along with the data which means that a portion of the transmission capacity is devoted to the clock signal; this presents problems if the available capacity is small compared to the data rate requirements. The third method, self-synchronization, is a very efficient method of synchronizing the receiver to the transmitter. Self-synchronization methods extract a local carrier reference as well as timing information from the received waveforms. Many conventional self-synchronizing circuits make use of a phase locked loop (PLL) for extracting the correct phase and frequency of the carrier waveform.

However, presently-available analog PLL-demodulators typically require tweaking. Furthermore, it is not easy to change their operating frequency. Low pass filters are required to remove input glitches and high order harmonics at the demodulator outputs. System parameters are not easily changed. These devices rely upon an analog level comparator to differentiate the phase angle of the incoming signal. The demodulated signal transmissions are not clearly defined. These devices incorporate no error correcting features.

Conventional digital signal demodulators require A/D and D/A converters resulting in a slow speed system which is implemented only at very high cost.

SUMMARY OF THE INVENTION

It is an object of the present invention to provide carrier and symbol synchronizing circuitry which requires no analog timing elements.

It is an object of the present invention to provide carrier and symbol synchronizing circuitry having a system clock which determines operating frequency.

It is an object of the present invention to provide carrier and symbol synchronizing circuitry which uses no A-to-D or D-to-A converters.

It is an object of the present invention to provide carrier and symbol synchronizing circuitry with no trimming requirements.

It is an object of the present invention to provide carrier and symbol synchronizing circuitry which exhibits predictable performance and wherein side-band or harmonic locking can be eliminated due to controlled circuit parameters.

These and other objects of the invention are accomplished by providing a synchronizer circuit for recovering a clock signal from synchronizing strobes derived from a modulated dibit phase shift keying (PSK) input signal. The circuit includes a phase detector which samples the counter outputs of a number controlled oscillator at the zero crossings of the synchronizing strobes to generate binary weighted outputs. The binary weighted outputs are a measure of the phase error between the counter outputs of the number controlled oscillator and the synchronizing strobes. The high order bits of the phase detector output, representing the phase error, are provided to a phase detector code converter. The low order bits of the phase detector output are provided to a phase detector remainder accumulator. The phase detector remainder accumulator accumulates the low order bits of the phase detector output to generate an overflow signal. The phase detector code converter receives the phase error signal from the phase detector and the overflow signal from the phase detector remainder accumulator and generates three outputs. The first output represents the sum of the incoming phase error and the overflow signal. The second output represents the difference between the inverted phase error and the overflow signal. The third signal is set high when the phase error is within a predefined window. A lock signal integrator receives the phase window output from the phase detector code converter and provides a lock signal to a delay segment controller in response to a control signal. The second output from the phase detector code converter is provided to an integrator which integrates the phase error readings to produce an integrated phase error term which is used to adjust the number controlled oscillator to the center frequency of the synchronizing strobes. The low order bits of the integrator are provided to an integrator rate generator which generates a control output. The synchronizer circuit, in its preferred embodiment, includes three tri-state buffers. A proportional tri-state buffer latches in the proportional outputs of the phase detector code converter and loads them into the number controlled oscillator in response to a proportional buffer enable signal generated by the delay segment controller. An integrator tri-state buffer receives the high order bits of the integrated phase error term and loads them into the number controlle oscillator in response to an integrator buffer enable signal generated by the delay segment controller. The third buffer, a base tri-state buffer, receives the control output from the integrator rate generator and loads it into the number controlled oscillator in response to a base buffer enable signal generated by the delay segment controller. The number controlled oscillator receives the outputs of the three tri-state buffers and generates the recovered clock signal. The delay segment controller controls the loading of the number controlled oscillator based on the lock signal provided by the lock signal integrator.

DESCRIPTION OF THE DRAWINGS

FIG. 1 is a schematic block diagram illustrating a receiver which incorporates a carrier synchronizer circuit and a symbol synchronizer circuit in accordance with the present invention.

FIGS. 2A-2D combine to provide a circuit schematic illustrating the receiver shown in FIG. 1.

FIG. 3 is a schematic block diagram illustrating a carrier synchronizer circuit in accordance with the present invention.

FIGS. 4A-4D combine to provide a schematic diagram illustrating a carrier synchronizer circuit in accordance with the present invention.

FIGS. 5A-5D combine to provide a schematic diagram illustrating a symbol synchronizer circuit in accordance with the present invention.

FIG. 6 is a timing diagram illustrating the relationship between an incoming DBPSK signal and a 4x carrier clock recovered by a carrier synchronizer circuit in accordance with the present invention.

DETAILED DESCRIPTION OF THE PREFERRED EMBODIMENT

Figure 4A:
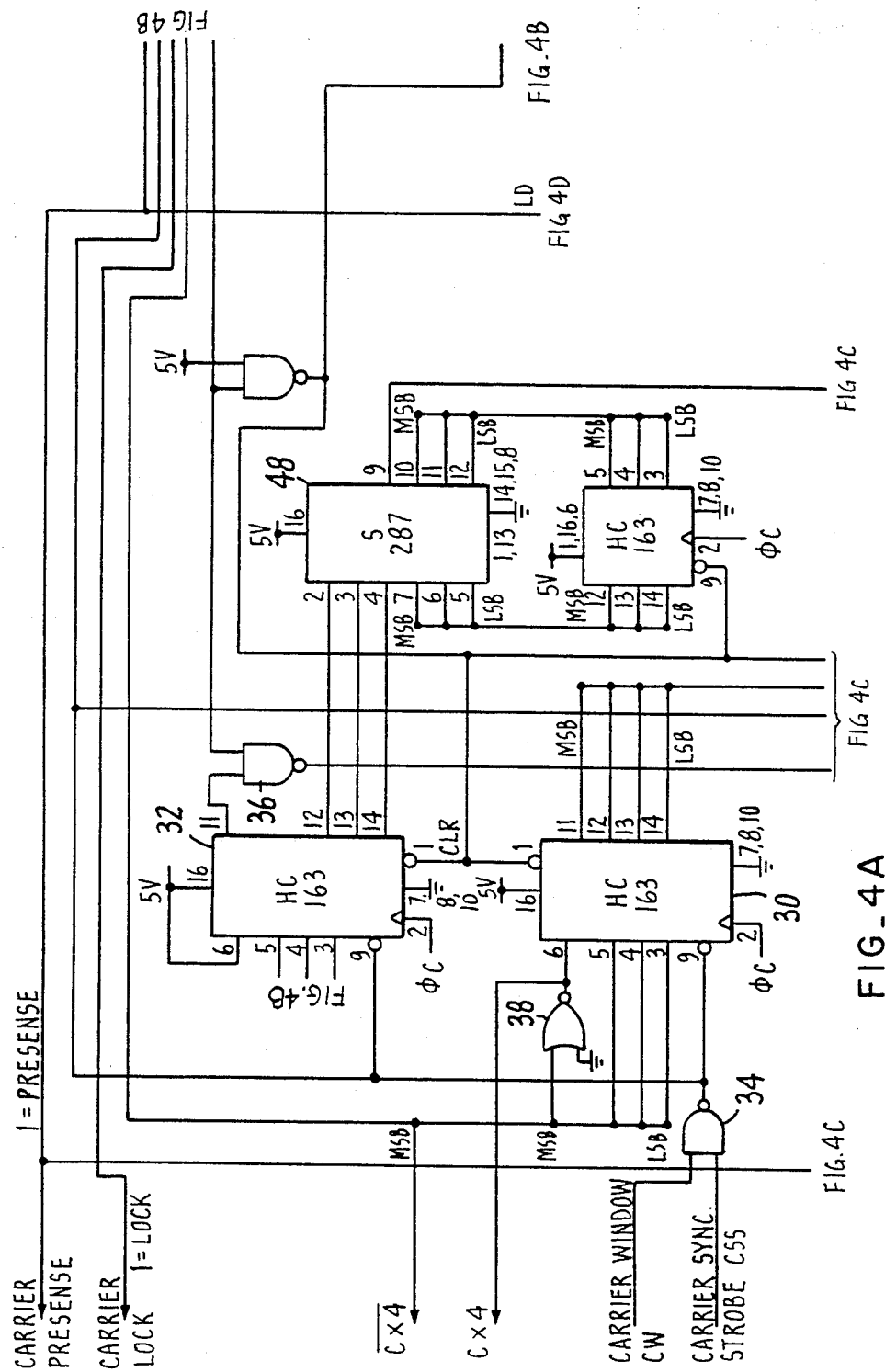

FIG. 1 shows a block diagram of a typical receiver circuit. As shown in FIG. 1, an incoming PSK signal 14 is received from a telephone line by a switch capacitor filter 16 which generates an output to a zero crossing detector 18. The zero crossing detector 18 determines the zero crossings occurring in the modulated dibit PSK signal and provides both a filtered input signal to a convolution data recovery circuit 20 and carrier synchronization strobes to carrier synchronizer 10. The carrier synchronizer 10 recovers the carrier clock and provides it as an additional input to the data recovery circuit 20. The decoded outputs of the data recovery circuit 20 are provided to a differentiator/strobe generator 22. The differentiator/strobe generator 22 provides as outputs both the strobes to symbol synchronizer 12 and the PSK dibit signal to a differential dibit decoder 24. The symbol synchronizer 12 generates three outputs: (i) a carrier window gating signal which is used by carrier synchronizer 10, (ii) recovered symbol clocks which are used to clock the dibit decoder 24 and a descrambler 26, and (iii) the recovered data clock. The differential dibit decoder 24 provides a bit stream to a descrambler 26 which sequences the bit stream to provide a recovered data output signal 28.

A circuit implementation of the receiver shown in FIG. 1 is schematically illustrated in FIGS. 2A-2D. The two blocks designated Carrier Synchronizer 10 (FIG. 2A) and Symbol Synchronizer 12 (FIG. 2B) are the subjects of the present invention. Detailed circuit-schematics illustrating Carrier Synchronizer 10 and Symbol Synchronizer 12 are provided in FIGS. 4A-4D and 5A-5D, respectively.

Since the design of the carrier synchronizer circuit of the present invention and the symbol synchronizer circuit of the present invention share a common architecture, only the carrier synchronizer block diagram is provided in FIG. 3 for explanation purpose.

The differences between the carrier synchronizer 10 and the symbol synchronizer 12 are as follows:
 (1) the control word length - the carrier synchronizer 10 uses a 4-bit control word, while the symbol synchronizer 12 uses a 5-bit control word;
 (2) the number controlled oscillator (NCO) is implemented in the two synchronizers with different divided-by ratios; the ratio in the carrier synchronizer 10 is 256, while in the symbol synchronizer 12 the ratio is 2048;
 (3) due to different control word lengths and divided-by ratios, the two circuits provide different characteristic regarding locking range, damping factor and etc.;
 (4) the phase detector remainder accumulator utilized in the carrier synchronizer 10 is omitted in the symbol synchronizer 12 in a cost-performance trade-off; and
 (5) the input to the carrier synchronizer 10 is gated by the carrier-window signal derived from the symbol synchronizer 12.

As shown in FIG. 2A, the input requirements for the carrier synchronizer 10 are as follows:
 (1) a system clock $\phi_c$ which is 1.2288 MHz for the low-band mode and 2.4576 MHz for the high-band mode;
 (2) carrier synchronization strobes CSS which are derived from the zero crossings of the modulated dibit PSK signal; the width of the strobes is set to one system clock period and goes high when active;

(3) a carrier presense control signal which is active high and is used to activate a fast-lock circuit; the derivation of the signal is not described in this specification, but it can be generated by any simple, well-known carrier rectification process; and (4) a carrier window gating signal which, as stated above, is derived from the symbol synchronizer 12; this signal is used to enhance jitter performance and to prevent a false lock onto harmonic and sideband frequencies.

As also shown in FIG. 2A, the two outputs of the carrier synchronizer 10 are as follows:

(1) a recovered carrier 4x-clock; the frequency of this clock is 4800 Hz in the low-band mode and changes to 9600 Hz when in the high-band mode; it feeds the convolution data recovery circuit 20 for data demodulation; the positive going edges of this clock are aligned to the 45-135-225-315 degree points of the incoming 4-phase carrier; and (2) a carrier lock signal which indicates the status of the carrier synchronizer 10.

As shown in FIG. 2B, the input requirements for the symbol synchronizer 12 are as follows:

(1) a 1.2288 MHz system clock $\phi_s$;

(2) symbol synchronization strobes which are derived from the changes of the recovered baseband data; since the system is a 4-phase demodulator, there are two strobing outputs from the "I" and "Q" channels; these two sources are then mixed together inside the symbol synchronizer 12; the width of two strobe outputs is set to one system clock period and high when active; and (3) a carrier presense control signal which is used to activate the fast-lock circuit; this signal is also applied to the carrier synchronizer 12.

As shown in FIG. 2B, the outputs of the symbol synchronizer 12 are as follows:

(1) a recovered symbol 1x-clock which is used to clock a dibit differential decoder 24; the positive going edges of this clock are aligned to the midpoint of the center of the strobing distributions;

(2) a recovered symbol 2x-clock which is used both to clock the descrambler circuit and as the recovered data clock to the outside world; and (3) a symbol lock signal which shows the status of the symbol synchronizer 12.

Referring to FIGS. 3 and 4A-4D, the architecture of the carrier synchronizer 10 (and of symbol synchronizer emulates an analog second-order phase-locked-loop.

A phase detector is formed by gated 4-bit "D" flip-flops 30 and 32 in combination with NAND gates 34 and 36 and NOR gate 38. Flip-flops 30 and 32 sample the outputs of a number-controlled-oscillator, described below, at the strobing intervals. The strobing signal corresponds to the zero crossings of the incoming signal as mentioned above. The outputs of the phase detector, i.e., pins 11-14 of flip-flop 30, are then transferred via ROM 42 (FIG. 4C) to latch 40 (FIG. 4B) during the terminal count of NCO counter 44 (FIG. 4B). These outputs are binary weighted and are measures of the phase error between the number controlled oscillator and the synchronizing strobes.

The phase detector characteristic is periodic and has an active linear phase range of +/- 180°. The gain of the setup is 16 counts per cycle of the number controlled oscillator.

The circuit arrangement tends to align the strobing signal to the center of the number controlled oscillator cycle. If the two are aligned, then the coding at the outputs of flip-flop 30 is said to be containing zero-phase-error. In numerical representation, if the terminal count of counter 44 is "15", then the middle count is "8". Due to the signal inversion at pin 6 of flip-flop 30, the code "8" is interpreted as a "0", so the code for zero-phase-error is "0".

This arrangement, coupled with a clearing signal connected to pin 1 of flip-flop 30, allows the phase detector to work with modulated signals and, thus, eliminates the need for a non-linear carrier regenerator of the type normally found in conventional synchronizer circuits.

The clearing signal sets the phase error outputs of flip-flop 30 to zero after each data transfer to latch 40, so that the rest of the synchronizer circuit sees no phase error coming out of the phase detector when there is a missing strobe embedded in the input pulse train.

Reffering to FIG. 4A, NAND gate 34 allows only "good" strobing signals to enter the phase detector. A "good" strobing signal refers to strobe signal zero crossings in the middle of a modulated dibit cell. If crossings at the edges of the cell were allowed to enter the phase detector, the jitter performance of carrier synchronizer 10 would be greatly impaired.

The opening of the window provided by NAND gate 34 is determined by the level ofllocking of symbol synchronizer 12. The window is wide open when symbol synchronizer 12 starts to search for incoming strobes, and then switches to half of a dibit period during frequency acquisition. The window is further reduced to a quarter when the circuit is completely in lock. This is clearly shown in the program listing "CWD.BAS" of ROM 46 (FIG. 5A) which is provided as Appendix A at the end of this specification. In addition to the enhancement of jitter performance, the gating effect also prevents carrier synchronizer 10 from locking onto some unwanted carrier sideband frequencies. One obvious example is the unidirectional-carrier-phase-rolling pattern.

Referring back to FIG. 4A, the low-order three bits of 4-bit gated flip-flop 32 are used in the same way as those of flip-flop 30, but are devoted to the remainder of the number controlled oscillator outputs, as described below. The high order bit is used to enable a lock signal integrator, described below, when there is a strobe entering the phase detector.

The function of phase detector remainder accumulator 48 is to reduce the amount of free-play in the number controlled oscillator that is due to the finite resolution implementation in the phase detector. To achieve better resolution without increasing the system clocking frequency, the remainders are processed by cumulating the least significant bits of the phase error output and adding "1" to the number controlled oscillator when there is an overflow. This is the purpose of the overflow signal at pin 9 of remainder accumulator 48 (FIG. 4A).

The relative clocking frequency of symbol synchronizer 12 is higher than that of carrier synchronizer 10 because the symbol number controlled oscillator clock is running at 600 Hz versus 4800 and 9600 Hz in the carrier synchronizer 10. The resulting jitter; performance is found to be adequate even if this remainder accumulator portion of the circuit is omitted from symbol synchronizer 12.

A phase detector code converter serves as an interpreter between the output of the phase detector and the number controlled oscillator controlling blocks, the lo proportional gain control and the integrator. It also provides a "lock enable" signal to the lock signal integrator. These three sets of outputs are functions of the phase error and the overflow signal from the phase detector remainder accumulator.

As shown in FIG. 4C, the first set of code converter outputs formed by pins 13, 9, 7 and 6 of ROM 42 is the sum of the incoming phase error and the overflow bit from the phase detector remainder accumulator. Statements #1100 and #1110 in the program listing of CPC.BAS, provided in Appendix B at the end of this specification, clearly describe the relationship between these signals. This output is then routed to the integrator for performing the second-order function of the control loop.

Pins 5, 4, 3 and 2 of ROM 42 represent the second set of code converter outputs which are provided to a proportional tri-state buffer, described below, to perform the proportional control part of the loop. Statement #1090 in program CPC.BAS defines this output as the difference between the inverted phase input and the overflow bit.

Pin 1 of ROM 42 goes high when the input phase error falls within a predefined window. This signal drives a lock signal integrator, described below, to set up the history of locking of the carrier synchronizer 10. The opening of the phase window is defined in statement #1080 of listing CPC.BAS.

As shown in FIG. 4B, the outputs of three buffers, i.e. proportional tri-state buffer/latch 40, integrator tri-state buffer 50, and base tri-state ROM/buffer 52, are connected to the number controlled oscillator for presetting purposes.

As shown in FIG. 4B, proportional tri-state buffer/latch 40 is a 4-bit latch buffer. At each terminal count of the number controlled oscillator, the phase error reading from ROM 42 is latched into buffer 40 and remains there until the next update, i.e. the next terminal count. The latched value is eventually loaded into the number controlled oscillator during the proportional segment of the cycle of the number controlled oscillator. Segment timing is allocated by the delay segment controller 82, 84, 86.

Integrator tri-state buffer 50 is a 4-bit buffer which loads the integrated phase error readings from the integrator into the number controlled oscillator during its integrator segment. Again, this segment is allocated by the delay segment controller.

Base tri-state ROM/buffer 52 is an 8 by 4 bit ROM which stores three base values for padding the aforementioned timing quantities to make up the cycle of the number controlled oscillator, as described in greater detail below. Pin 10 of buffer 52 is driven by the output of the integrator remainder rate generator. This output, when high, adds "1" to the selected base quantity as described in statement #1090 of the program listing "CBP.BAS", provided in Appendix C at the end of this specification. This eliminates the need for a "real" adder circuit due to the fact that all the base numbers are fixed values.

Referring to FIG. 4C, components 54, 56 and 58 form a lock signal integrator. Components 54 and 58 form an 8-bit up-down counter which counts up when the incoming strobe falls within a predetermined phase window, based on the signal derived in the phase detector code converter, and counts down when outside. As mentioned above in the discussion of the phase detector, the enable signal from pin 6 of NAND gate 36 further provides a gating effect that will prevent the counter from changing state when there is a missing strobe. The configuration, therefore, is coherent and produces an accurate indication of the locking history of the number controlled oscillator to the phase of the incoming signal.

Decoder ROM 56 (FIG. 4C) manipulates the counts at the outputs of the counter and generates two outputs. Pin 11 of ROM 56 is the synchronizer locked output which goes high when the counter reaches a predefined level. The other output is available at pin 12 of ROM 56 and stops the counter from counting up if the counter is at it's maximum count or from counting down if it is at it's zero count. The "maximum count" is a preprogrammed value in ROM 56 and the "zero count" is equivalent to the zero count of counter 54. The program listing "CLD.BAS" of ROM 56 is provided as Appendix D at the end of this specification.

Referring to FIGS. 4C-4D, an integrator formed by components 60, 62, 64, 66, 68, 70, 72 and 74 integrates the phase error readings from the phase detector and produces an integrated phase error term. This term is used to adjust the number controlled oscillator to the center frequency of the input signal.

Components 70, 72 and 74 are connected as a 12-bit up-down counter which stores the cumulated phase error. The "up" or "down" counting depends on the direction of the phase error form the zero-phase-error condition. The three high-order output bits are fed to the number controlled oscillator via buffer 50, so that the number controlled oscillator can be adjusted to the frequency of the incoming signal.

Components 64 and 66 create a window period proportional to the phase error from the phase detector. This window signal is used to enable the counter-chain. If the phase error is "8", then the enable period is zero since the code "8" is considered as zero phase error. If the output is a "9", the enable signal will last for one clock period and, hence, the counter will increase by one.

Reffering to FIG. 4D, NOR gate 68, connected at pin 15 of up-down counter 70, prevents the counter from overloading, e.g., wrapping around to the opposite polarity of the counts. This simulates the voltage bounds on a practical analog op-amp circuit.

During the fast-locking mode, counter 60 and NOR gate 62 expand the enable window by masking some of the clocking pulses to counter 64. Thus, the gain of the integrator can be increased. The gain of the integrator under the normal mode is 1/512 per NCO cycle and during the fast-locking mode is 1/32 per NCO cycle.

Pin 13 of counter 70 is the least significant bit justified relative to the number controlled oscillator. In order to improve jitter performance, the remainders (bits which are lower order than pin 13) are fed to an integrator rate generator shown in FIG. 4D.

The integrator rate generator is formed by components 76 and 78. The fractional quantity from the integrator is fed to rate generator 76. The purpose of flip-flop 78 is to remove the clock gating effect built inside rate generator 76. The combined circuit provides a toggling output at pin 9 of flip-flop 78, which switches at the middle of the NCO cycle. The ratio of "high" to "low" levels measured at this pin is equivalent to the number feeding rate generator 76 divided by 16, i.e., if the input is "1", the output will stay high for one NCO cycle and low for the rest of the fifteen cycles.

The binary value of this output is added to the base number in base buffer 52 and loaded into the number controlled oscillator during the base segment.

Referring to FIG. 4B, the number controlled oscillator is formed by counters 44 and 80 which form an 8-bit up-counter which divides the system clock to four times the incoming carrier frequency, as described above.

One cycle of the number controlled oscillator consists of several delay segments. A delay segment is defined as follows:

(1) There is a number loaded into the counter; and
(2) The counter uses the number as the starting point and counts up to the terminal count.

During fast-locking mode, there are six delay segments in one cycle of the number controlled oscillator:

(1) Integrator segment: the integrator is running at the 16x rate. The amount of delay in this segment is 1-4-8 (min-zero error-max) counts. The terminal count is "15";
(2) Proportional-0-segment: The amount of delay in this segment is 1-9-16 (min-zero-max) counts. The terminal count is also "15";
(3) Proportional-1-segment: same as the Proportional-0-segment;
(4) Proportional-2-segment: same as the Proportional-0-segment;
(5) Proportional-3-segment: same as the Proportional-0-segment;
(6) Base segment: this segment is to pad all the previous segments so that the total delay matches the period of the center frequency of the incoming signal. The terminal count is "255".

During the normal mode, the proportional 1/2/3 segments are all omitted in order to accommodate a low-closed-loop-gain characteristic, so there are only three delay segments required to make up the total delay period. In addition to this, the gain of the integrator is switched back to the 1x rate to keep the damping factor constant. Obviously, a different base number is necessary to maintain the total delay period. This is accomplished by feeding the system lock signal to pin 11 of base buffer 52.

The gain of the number controlled oscillator is a function of the length of the counter chain, which is 1/256 per count.

At the start of acquisition, only the base-segment is required to align the NCO phase to the incoming strobe. This quantity is set to half the value of the total period. This explains why there are a total of three different base numbers stored in base buffer 52.

The delay segment allocation, i.e loading of the counter, is controlled by a delay segment controller formed by components 82, 84 and 86. These three components form a state-machine which controls the loading of the number controlled oscillator. The result of this block is to achieve "very-fast-locking" synchronizer as well as a "smooth-change-over" operation between the fast-locking mode and the "normal" mode.

At the start of acquisition, the number controlled oscillator is forced to align to the second edge of the incoming signal and then the integrator is set to its center value. Afterwards, the synchronizer operates in the fast-frequency/phase tracking mode. Once the integrator settles, the loop switches to the slow frequency/phase tracking mode in order to accommodate a better jitter performance.

There are eight states of operations. Upon initialization (carrier presense signal goes high), the state is set to "0". Once a strobe comes in (the first edge), state "1" will be entered with the integrator set at center (zero frequency error) (Refer to statement #1130 in program listing "DSC.BAS" provided in Appendix E at the end of this specification.).

The second edge will flip the state to "7" and put the first base number into the number controlled oscillator. This number produces one-half of the delay of a NCO cycle. At the completion of the up-counting, the state will be set to "2". The integrator segment is then entered. At this pint of time, the phase of the number controlled oscillator is substantially aligned with the incoming signal, except for the frequency error if the incoming frequency is not at the center value.

The delay segment controller then sequentially operates in the following state sequence: {2, 3, 4, 5, 6, 7, 2} and so on, until the integrator settles down. This is signified by the synchonizer-locked signal from ROM 56. This long sequence is defined as the Fast-Tracking mode.

Once the lock signal goes high and the state is "3", the controller will skip states 4, 5 and 6 and perform the following sequence: {2, 3, 7, 2} and so on. This is defined as the Normal mode. The synchronizer may switch back to the Fast-Tracking mode if the system is out of lock due to various reasons. However, the controller will not go back to state "0" unless the carrier presence signal returns to zero.

As stated above, ROMs 84 and 86 contain the program DSC.BAS (Appendix E) to perform the above sequences. Referring to FIG. 4B, pin 9 of ROM 84 controls the loading of the number controlled oscillator. Pins 10, 11, 12, 2, 3 and 4 are devoted to the "8-state counter". Pin 9 of ROM 86 is used to generate the base numbers. Pins 10, 11 and 12 of ROM 86 provide signals to enable the base buffer 52, the proportional buffer 40 and the integrator buffer 50, respectively.

Most of the logic blocks in the two synchronizers of the present invention are implemented with read-only-memories (ROM). The codings of the ROM's are produced via the use of "basic programs", in which all the input/output relationships are defined by means of program statements. The final codes are then transferred to another program which in turn generates a programmable-logic-array map. This map shows that an AND-OR-gate array will produce the same result as the ROM counterpart; but the array method takes much less silicon area during circuit integration.

It should be understood that various alternatives to the embodiment shown herein may be employed in practicing the present invention. It is intended that the following claims define the invention and that circuits within the scope of these claims and their equivalents be covered thereby.

APPENDIX A

```
1000 ' CARRIER WINDOW DECODER ********* OCT 83 ******************* CWD.BAS **
1010 WIDTH 255: DEFINT A-Z: DIM L(511)
1020 '****************************************************************
1030 FOR X=0 TO 511
1040    STT=(X AND &H180)\&H80
1050    S12=(X AND &H40)\&H40
1060    SYL=(X AND &H20)\&H20
1070    STM=(X AND &H1F)
1080 '****************************************************************
1090    IF STT=0 THEN L(X)=1: GOTO 1140
1100    IF ((S12=0) AND (SYL=0) AND (STM>= 4) AND (STM<= 4+15)) THEN L(X)=1
1110    IF ((S12=0) AND (SYL=1) AND (STM>= 8) AND (STM<= 8+7 )) THEN L(X)=1
1120    IF ((S12=1) AND (SYL=0) AND (STM>=14) AND (STM<=14+15)) THEN L(X)=1
1130    IF ((S12=1) AND (SYL=1) AND (STM>=18) AND (STM<=18+7 )) THEN L(X)=1
1140 '****************************************************************
1150    PRINT HEX$(X)+"   "+HEX$(L(X))
1160 NEXT
1170 '****************************************************************
1180 OPEN "O",#1,"B:CWD"
1190    FOR X=0 TO 511: PRINT #1,CHR$(L(X));: NEXT: CLOSE: END
```

APPENDIX B

```
1000 ' CARRIER PD CODE CONVERTER ****** OCT 83 ****************** CPC.BAS **
1010 WIDTH 255: DEFINT A-Z: DIM L(31)
1020 '****************************************************************
1030 FOR X=0 TO 31
1040    M1=(X AND &H10)\&H10
1050    P =(X AND &HF)
1060 '****************************************************************
1070    IF P>=8 THEN PO=P-16 ELSE PO=P
1080    IF (ABS(PO)<=2) THEN LK=1 ELSE LK=0
1090       PO=P XOR 7: IF ((PO>0) AND (M1=1)) THEN PO=PO-1
1100       IO=P AND 7: IF M1=1 THEN IO=(IO+1) AND &HF
1110                   IF ((IO=8) AND (M1=1)) THEN IO=7
1120    L(X)=(IO*32)+(PO*2)+LK
1130 '****************************************************************
1140    PRINT HEX$(X)+"   "+HEX$(L(X))
1150 NEXT
1160 '****************************************************************
1170 OPEN "O",#1,"B:CPC"
1180    FOR X=0 TO 31: PRINT #1,CHR$(L(X));: NEXT: CLOSE: END
```

APPENDIX C

```
1000 ' CARRIER BASE PRESET ************ OCT 83 ****************** CBP.BAS **
1010 WIDTH 255: DEFINT A-Z: DIM L(7)
1020 '****************************************************************
1030 FOR X=0 TO 7
1040    CM=(X AND 4)\4
1050    LK=(X AND 2)\2
1060    IC=(X AND 1)
1070 '****************************************************************
1080    IF LK=0 THEN O=4+(9*4) ELSE O=4+9
1090    IF IC=1 THEN O=O+1
1100    IF CM=1 THEN O=0
1110    L(X)=O AND &HF
1120 '****************************************************************
1130    PRINT HEX$(X)+"   "+HEX$(L(X))
1140 NEXT
1150 '****************************************************************
1160 OPEN "O",#1,"B:CBP"
1170    FOR X=0 TO 7: PRINT #1,CHR$(L(X));: NEXT: CLOSE: END
```

APPENDIX D

```
1000 ' CARRIER LOCK DECODER *********** OCT 83 ****************** CLD.BAS **
1010 WIDTH 255: DEFINT A-Z: DIM L(63)
1020 '******************************************************************
1030 FOR X=0 TO 63
1040    UD=(X AND &H20)\&H20
1050    CY=(X AND &H10)\&H10
1060    CC=(X AND &HF)
1070 '******************************************************************
1080    EN=0
1090    IF ((UD=1) AND (CC=3) AND (CY=0)) THEN EN=1
1100    IF ((UD=0) AND (CC=0) AND (CY=0)) THEN EN=1
1110       IF CC=3 THEN LK=1 ELSE LK=0
1120    L(X)=(LK*2)+EN
1130 '******************************************************************
1140    PRINT HEX$(X)+"      "+HEX$(L(X))
1150 NEXT
1160 '******************************************************************
1170 OPEN "O",#1,"B:CLD"
1180    FOR X=0 TO 63: PRINT #1,CHR$(L(X));: NEXT: CLOSE: END
```

APPENDIX E

```
1000 ' DELAY SEGMENT CONTROLLER ******** OCT 83 ***************** DSC.BAS **
1010 WIDTH 255: DEFINT A-Z: DIM L(127):  DIM M(127)
1020 '******************************************************************
1030 FOR X=0 TO 127
1040    STB=(X AND &H40)\&H40
1050    STT=(X AND &H38)\8
1060    CH =(X AND &H4 )\4
1070    CL =(X AND &H2 )\2
1080    LK =(X AND &H1 )\1
1090 '******************************************************************
1100    ON STT+1 GOTO 1110,1150,1190,1230,1290,1330,1370,1410
1110    ' FAST LOCK 0
1120       IF STB=1 THEN             LD=1: STO=0: CM=1: BE=0: PE=1: IE=1
1130       IF STB=0 THEN             LD=1: STO=1: CM=1: BE=0: PE=1: IE=1
1140       GOTO 1440
1150    ' FAST LOCK 1
1160       IF STB=1 THEN             LD=0: STO=1: CM=1: BE=0: PE=1: IE=1
1170       IF STB=0 THEN             LD=1: STO=7: CM=0: BE=1: PE=1: IE=0
1180       GOTO 1440
1190    ' ITEGRATOR
1200       IF CL =0 THEN             LD=1: STO=2: CM=0: BE=1: PE=0: IE=1
1210       IF CL =1 THEN             LD=0: STO=3: CM=0: BE=1: PE=0: IE=1
1220       GOTO 1440
1230    ' PROPORTIONAL 0
1240       IF ((CL=0) AND (LK=0)) THEN LD=1: STO=3: CM=0: BE=1: PE=0: IE=1
1250       IF ((CL=0) AND (LK=1)) THEN LD=1: STO=3: CM=0: BE=0: PE=1: IE=1
1260       IF ((CL=1) AND (LK=0)) THEN LD=0: STO=4: CM=0: BE=1: PE=0: IE=1
1270       IF ((CL=1) AND (LK=1)) THEN LD=0: STO=7: CM=0: BE=0: PE=1: IE=1
1280       GOTO 1440
1290    ' PROPORTIONAL 1
1300       IF CL =0 THEN             LD=1: STO=4: CM=0: BE=1: PE=0: IE=1
1310       IF CL =1 THEN             LD=0: STO=5: CM=0: BE=1: PE=0: IE=1
1320       GOTO 1440
1330    ' PROPORTIONAL 2
1340       IF CL =0 THEN             LD=1: STO=5: CM=0: BE=1: PE=0: IE=1
1350       IF CL =1 THEN             LD=0: STO=6: CM=0: BE=1: PE=0: IE=1
1360       GOTO 1440
1370    ' PROPORTIONAL 3
1380       IF CL =0 THEN             LD=1: STO=6: CM=0: BE=0: PE=1: IE=1
1390       IF CL =1 THEN             LD=0: STO=7: CM=0. BE=0: PE=1: IE=1
1400       GOTO 1440
1410    ' BASE
1420       IF CH =0 THEN             LD=1: STO=7: CM=0: BE=1: PE=1: IE=0
1430       IF CH =1 THEN             LD=0: STO=2: CM=0: BE=1: PE=1: IE=0
1440 '******************************************************************
1450    L(X)=(LD*8)+STO
1460    M(X)=(CM*8)+(BE*4)+(PE*2)+(IE)
1470    PRINT HEX$(X)+"       "+HEX$(L(X))+"   "+HEX$(M(X))
```

```
1480 NEXT
1490 OPEN "O",#1,"B:DSC1"
1500   FOR X=0 TO 127: PRINT #1,CHR$(L(X));: NEXT: CLOSE
1510 OPEN "O",#1,"B:DSC2"
1520   FOR X=0 TO 127: PRINT #1,CHR$(M(X));: NEXT: CLOSE: END
```

What is claimed is:

1. An apparatus for recovering a clock signal from a modulated phase shift keying (PSK) input signal, the apparatus comprising
   (a) means for generating synchronizing strobing intervals corresponding to zero crossings of the PSK input signal;
   (b) a number controlled oscillator having an output comprising the clock signal; and
   (c) a phase detector which samples the output of the number controlled oscillator at the synchronizing strobing intervals to generate binary weighted outputs which correspond to the phase error between the output of the number controlled oscillator and the synchronizing strobes.

2. An apparatus as in claim 1 and further including means for generating a clearing signal that resets the phase detector after generation of each binary weighted output.

3. A digital phase locked loop for recovering a clock signal from a modulated phase shift keying (PSK) input signal, the digital phase locked loop comprising:
   (a) a number controlled oscillator;
   (b) a phase detector which samples the output of a number controlled oscillator at strobing intervals corresponding to the zero crossings of a modulated phase shift keying (PSK) input signal to generate binary weighted outputs which are measures of the phase error between the number controlled oscillator and the strobing intervals;
   (c) a phase detector code converter for generating a proportional phase error signal which is a function of the phase error outputs of the phase detector;
   (d) an integrator for integrating the phase error outputs of the phase detector to produce an integrated phase error signal which is used to adjust the number controlled oscillator to the center frequency of the PSK input signal;
   (e) means for summing the proportional phase error signal and the frequency error signal to provide summing signals; and
   (f) a number controlled oscillator which receives the summing signals and generates a recovered clock signal.

4. A digital phase locked loop as in claim 3 and further including a phase detector remainder accumulator which cumulates the least significant bits of the phase error outputs to provide an overflow signal to the phase detector code converter.

5. A digital phase locked loop as in claim 4 wherein the phase detector code converter generates three sets of outputs, the first set of outputs being the sum of the phase error output and the overflow signal from the phase detector remainder accumulator, the second set of outputs being the proportional phase error signal, and the third set of outputs being indicative of when the phase error output is within a predefined window.

6. A digital phase locked loop as in claim 5 wherein the first set of phase detector code converter outputs is provided as in input to the integrator and the third set of outputs of the phase detector code converter is provided to a lock signal generator which generates a lock signal representative of the history of locking of the phase locked loop.

7. A digital phase locked loop as in claim 6 and further including an integrator remainder rate generator which receives a fractional quantity of the integrated phase error term from the integrator and provides a toggling output which drives the number controlled oscillator.

8. A digital phase locked loop as in claim 7 wherein the summing means comprises:
   (a) a proportional buffer which loads the proportional phase error signal from the phase detector code converter into the number controlled oscillator during a proportional segment of the cycle of the number controlled oscillator;
   (b) an integrator buffer which loads the integrator into the number controlled oscillator during an integrator segment of the cycle of the number controlled oscillator;
   (c) a base buffer which provides one of a plurality of base values to the number controlled oscillator in response to a base buffer enable signal, the base value being based upon the toggling output of the integrator remainder rate generator; and
   (d) a delay segment controller which allocates the segments of the cycled of the number controlled oscillator.

9. A synchronizer of the type which recovers a clock signal from a modulated phase shift keying (PSK) input signal, the synchronizer comprising:
   (a) a number controlled oscillator;
   (b) a phase detector which samples the output of the number controlled oscillator at strobing intervals corresponding to the zero crossings of a modulated PSK input signal to produce binary weighted outputs which are measures of the phase error between the number controlled oscillator and the strobing signals, the number controlled oscillator having a cycle comprising a plurality of segments;
   (c) a phase detector remainder accumulator which cumulates the least significant bits of the phase error outputs of the phase detector to provide an overflow output;
   (d) a phase detector code converter which generates three sets of outputs based upon the phase error outputs of the phase detector and the overflow output of the phase detector remainder accumulator, a first set of outputs being the sum of the phase error output and the overflow output, the second set of outputs being a proportional phase error signal which is a function of the phase error outputs, the third set of outputs being indicative of when the phase error output is within a predefined window;
   (e) an integrator which integrates the first set of outputs of the phase detector code converter to produce an integrated phase error term;
   (f) a lock signal generator which receives the third set of outputs of the phase detector code converter and generates a lock signal representative of the history of the locking of the synchronizer;
   (g) an integrator remainder rate generator which receives the least significant bits of the integrated phase error term and provides a toggling output to the number controlled oscillator;

(h) summing means comprising (i) a proportional buffer which loads the proportional phase error signal from the phase detector code converter into the number controlled oscillator during a proportional segment of the cycled of the number controlled oscillator;

(ii) an integrator buffer which loads the integrated phase error terms from the integrator into the number controlled oscillator during an integrator segment of the cycle of the number controlled oscillator; and (iii) a base buffer which provides one of a plurality of base values to the number controlled oscillator in response to a base buffer enable signal, the base value being determined by the toggling output of the integrator remainder rate generator;

(i) a number controlled oscillator which receives the ouputs loaded by the summing means to generate a recovered clock signal;

(j) a delay segment controller the output of which allocates the segments of the cycle of the number controlled oscillator; and (k) means for generating a base buffer enable signal.

10. A synchronizer as in claim 9 wherein the delay segment controller operates in a plurality of sequences, a particular sequence being determined by the lock signal from the lock signal generator.

* * * * *

UNITED STATES PATENT AND TRADEMARK OFFICE
CERTIFICATE OF CORRECTION

PATENT NO. : 4,787,096
DATED : November 22, 1988
INVENTOR(S) : Hee Wong

It is certified that error appears in the above - identified patent and that said Letters Patent is hereby corrected as shown below:

Col. 3, line 36 "controlle" should be
        --controlled--.

Col. 6, line 31 "ofllocking " should be
        --of locking--.

Col. 6, line 67 "jitter;" should be
        --jitter--.

Col. 7, line 5 delete "10".

Col. 15, line 67 "in" should be
        --an--.

Col. 17, line 9 "cycled" should be

--cycle--.

Signed and Sealed this

Fourth Day of April, 1989

*Attest:*

DONALD J. QUIGG

*Attesting Officer*      *Commissioner of Patents and Trademarks*